E. SOPPITT.
INTERNAL COMBUSTION ENGINE.
APPLICATION FILED OCT. 16, 1915.

1,249,845.

Patented Dec. 11, 1917.
3 SHEETS—SHEET 1.

WITNESSES

INVENTOR
Edward Soppitt,
BY
ATTORNEY

E. SOPPITT.
INTERNAL COMBUSTION ENGINE.
APPLICATION FILED OCT. 16, 1915.

1,249,845.

Patented Dec. 11, 1917.
3 SHEETS—SHEET 2.

WITNESSES

INVENTOR
Edward Soppitt,
BY
ATTORNEY

E. SOPPITT.
INTERNAL COMBUSTION ENGINE.
APPLICATION FILED OCT. 16, 1915.

1,249,845.

Patented Dec. 11, 1917.
3 SHEETS—SHEET 3.

WITNESSES

INVENTOR
Edward Soppitt,
BY
ATTORNEY

UNITED STATES PATENT OFFICE.

EDWARD SOPPITT, OF LATROBE, PENNSYLVANIA.

INTERNAL-COMBUSTION ENGINE.

1,249,845.    Specification of Letters Patent.    Patented Dec. 11, 1917.

Application filed October 16, 1915. Serial No. 56,264.

*To all whom it may concern:*

Be it known that I, EDWARD SOPPITT, citizen of the United States, residing at Latrobe, in the county of Westmoreland and State of Pennsylvania, have invented certain new and useful Improvements in Internal-Combustion Engines, of which the following is a specification.

This invention relates to improvements in internal combustion engines and has particular application to an internal combustion engine of the rotary type.

In carrying out the present invention, it is my purpose to provide a rotary internal combustion engine wherein power impulses will be given to the rotor in rapid succession so that continuous motion will be imparted to the shaft of the engine and the driven members coupled up to the engine actuated evenly and uniformly and without shock or jar.

It is also my purpose to improve and simplify the general construction of engines of the class described and to provide an engine which may be readily reversed when desired or necessary and which will deliver its full quota of work with a minimum fuel consumption.

A further object of my invention is to provide a rotary internal combustion engine wherein the moving parts may be efficiently and effectively lubricated so as to minimize friction, and wherein the component parts will be so arranged and correlated as to reduce the possibility of derangement to a minimum.

With the above and other objects in view, the invention consists in the construction, combination and arrangement of parts hereinafter set forth in and falling within the scope of the claims.

Figure 1:
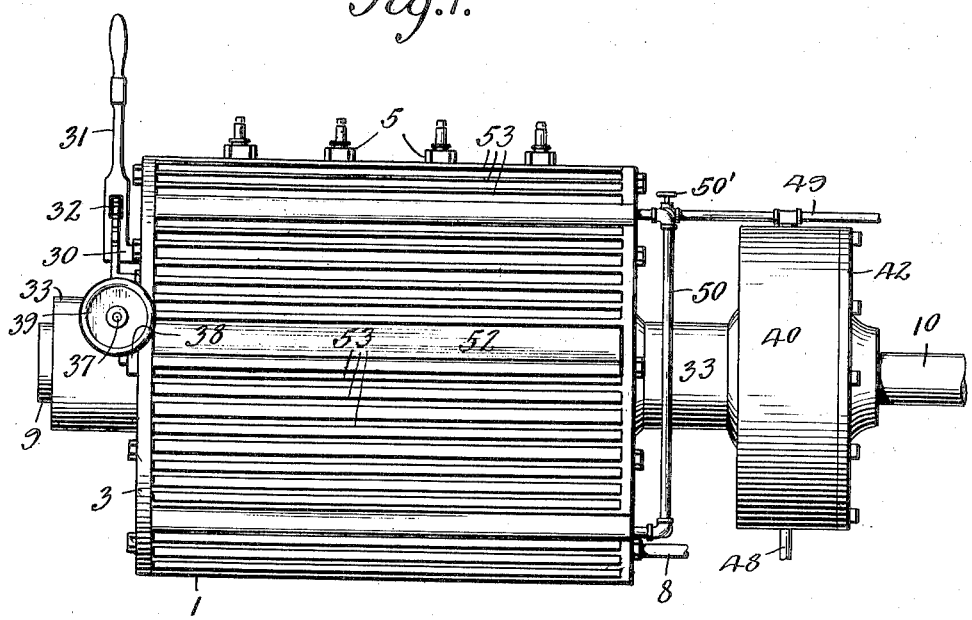
Figure 1 is a view in side elevation of a rotary internal combustion engine constructed in accordance with the present invention.
Figure 2:
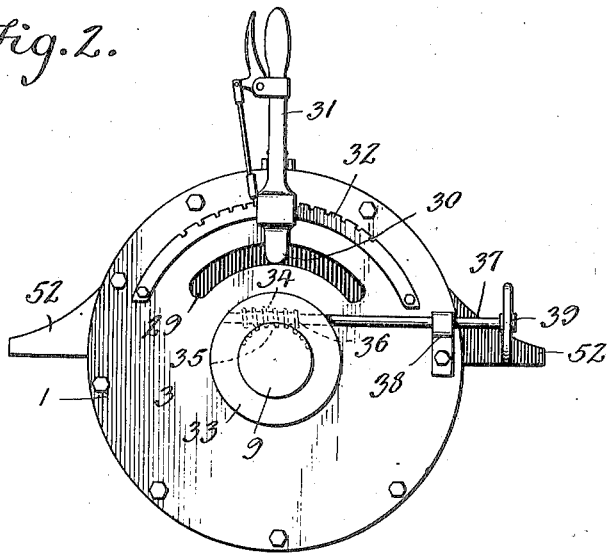
Fig. 2 is an end view thereof.
Figure 3:
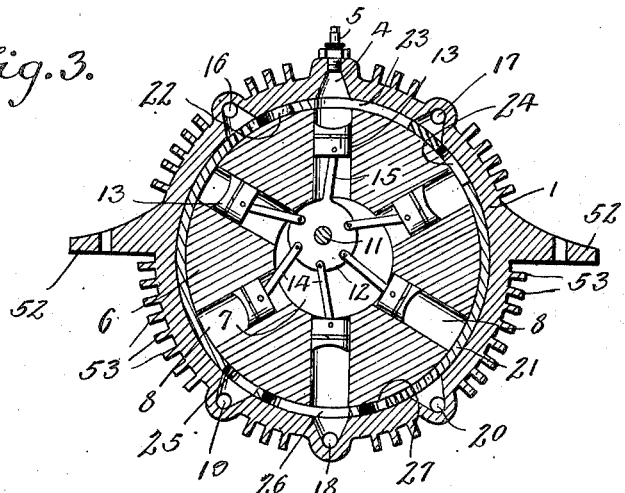
Fig. 3 is a transverse sectional view through the same.
Figure 6:
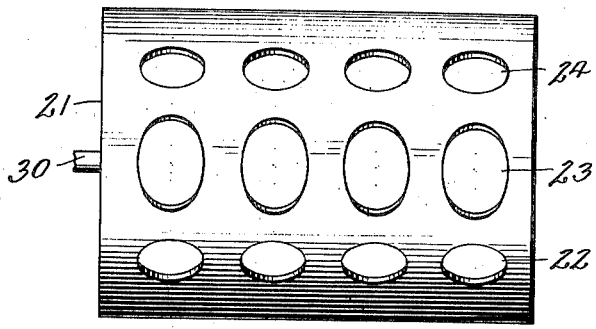
Fig. 6 is a view in side elevation of the sleeve valve removed from the engine.
Figure 7:
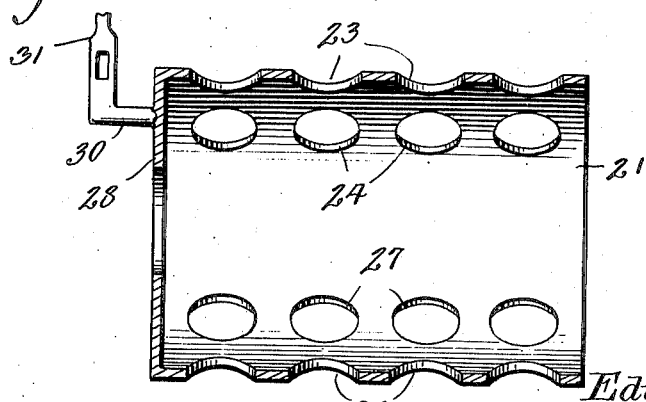
Fig. 7 is a longitudinal sectional view through the valve.
Figure 4:
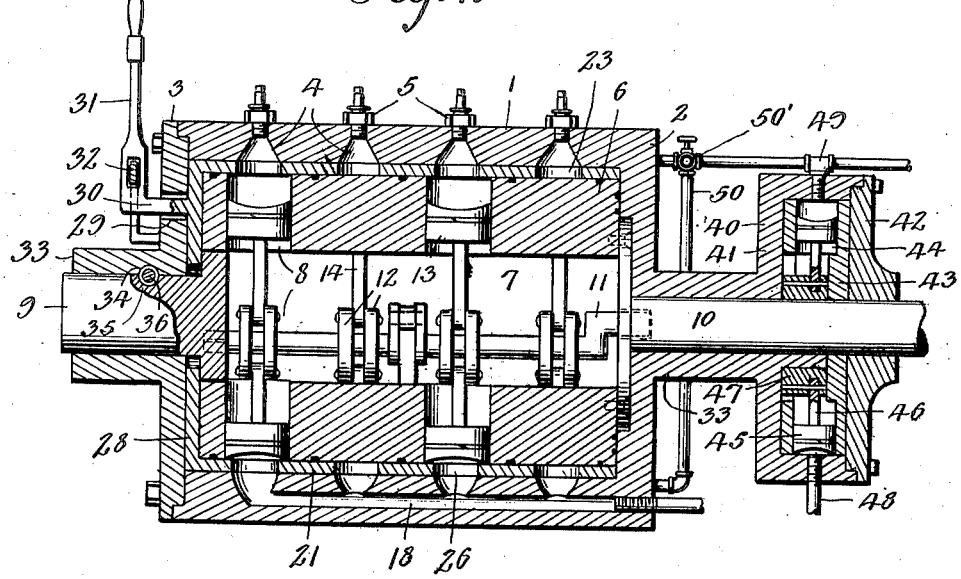
Fig. 4 is a longitudinal sectional view therethrough.
Figure 5:
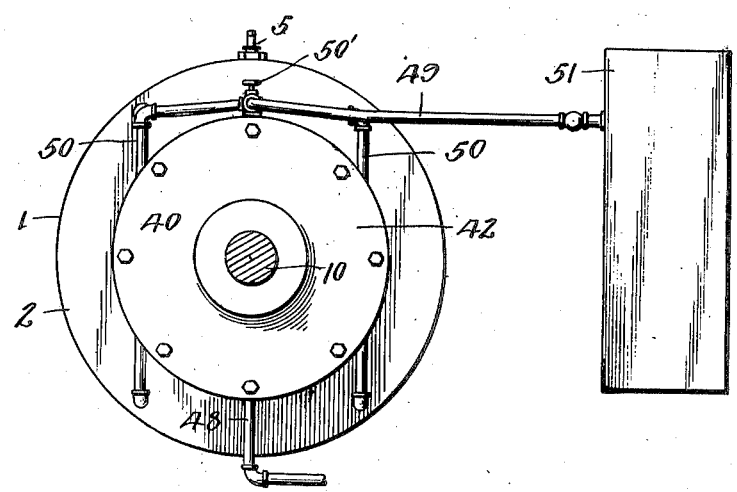
Fig. 5 is a view of the other end of the motor.

Referring now to the drawings in detail, 1 designates a horizontal cylinder having one end closed by means of an end wall 2 which may be formed integral with the cylinder and the other end closed by means of an end wall 3 which is removable from the cylinder, suitable bolts being employed to hold the end wall 3 in position. Formed in the upper portion of the cylinder 1 and spaced apart longitudinally thereof are openings 4 and mounted within the respective openings 4 and suitably secured therein are spark plugs 5. Mounted within the cylinder 1 and adapted to rotate therein is a rotor 6 formed with a longitudinally extending axial bore 7, and with rows of radial pockets 8, the rows corresponding in number with the spark plugs 5. The pockets 8 in each row are spaced apart equal distances about the rotor and the inner ends thereof open into the bore 7, while the outer extremities open onto the outer surface of the rotor. Formed in the end walls 2 and 3 respectively are bearing openings alining axially with each other and with the bore in the rotor and journaled in the end of the rotor adjacent to the end plate 3 is a trunnion 9 mounted in the adjacent bearing opening, while suitably connected to the remaining end of the rotor and projecting through the bearing opening in the end wall 2 is a driving shaft 10 coöperating with the trunnion 9 to hold the rotor in proper position within the cylinder, and adapted to be connected to the machinery to be driven. Extending through the bore 7 in the rotor and fixed in horizontally alining bearings carried by the rotor and fixed to the trunnion 9 is a shaft 11 arranged at one side of the center of the bore 7 and loosely surrounding the shaft 11 are pairs of disks 12 spaced apart distances corresponding to the spaces between the rows of pockets 8. Slidably mounted within the radial pockets 8 in each row are pistons 13 and the inner ends of certain of the pistons 13 in the respective pockets in each row are connected through the medium of link rods 14 with the adjacent disks 12, while the remaining piston 13 in each row is connected with the adjacent disks 12 by means of a master rod 15, the piston end of the master rod being pivoted to the piston, while the remaining end thereof is fixed to the adjacent disks 12. Formed in the top portion of the cylinder 1 are longitudinal bores 16 and 17 disposed at opposite sides of the row of spark plugs 5 and in communication with the cylinder at points corresponding to the positions of the rows of pockets, while formed in the bottom portion of the cylinder at a point diametrically opposite the row of spark plugs is an exhaust passage 18 extending longitudinally of the cylinder and opening into the cylinder at points corresponding to the positions of the rows of pockets. Also formed in the cylinder 1 and extending longitudinally thereof are fuel inlet passages 19, 20 disposed upon opposite sides of the exhaust passage 18 and each opening into the cylinder at points corresponding to the rows of pockets. Surrounding the rotor 6 between the latter and the inner wall of the cylinder is a sleeve valve 21 capable of rotary movement and having the upper portion thereof formed with longitudinally extending rows of openings 22, 23 and 24 adapted to communicate, respectively, with the bore 16, the row of openings 4 and the bore 17, respectively, while formed in the lower portion of the sleeve valve are longitudinally extending rows of openings 25, 26 and 27 adapted to communicate, respectively, with the passages 19, 18 and 20. In the present instance, one end of the sleeve valve 21 is formed with an inwardly extending annular flange 28 disposed concentrically of the trunnion 9 and interposed between the end wall 3 of the cylinder and the adjacent end of the rotor. Fixed to this flange 28 and projecting outwardly therefrom through an arcuate-shaped slot 29 in the end wall 3 is a pin 30 and secured to the outer end of the pin 30 and projecting upwardly therefrom is an operating lever 31 movable over a segmental rack 32 fastened to the end wall 3 concentrically of the slot 29 and having the teeth thereof adapted to be engaged by a latch dog on the lever 31 so that the lever may be held in the desired adjusted position. Surrounding the trunnion 9 and the shaft 10 and fastened to the respective end walls of the cylinder concentrically of the openings therein are bearing sleeves 33, 33 and formed in the bearing sleeve 33 on the end plate 3 is a tangential opening 34 registering with a similar groove 35 formed in the trunnion 9 and the wall of the groove 35 is formed with a worm thread that is engaged by a worm 36 carried upon one end of a horizontal shaft 37 rotatably mounted within a bearing 38 carried by the adjacent end plate 3. On the outer end of the shaft 37 is a hand wheel 39 whereby the shaft may be rotated.

Mounted upon the shaft 10 adjacent to the end plate 2 of the cylinder 1 is a compressor 40. In the present instance, this compressor 40 is similar in construction to the engine and embodies a stationary cylinder 41 arranged concentrically of the shaft 10 and having one end closed by a permanent wall formed integral with the outer end of the adjacent sleeve 33, and the opposite end closed by a removable wall 42 which is bolted or otherwise connected to the cylinder 41. Rotatably mounted upon the shaft 10 within the cylinder 41 is a rotor 43 formed with radial pockets 44 and in these pockets are slidably mounted pistons 45 respectively. The inner ends of the pistons 45 are connected by means of link rods 46 with an eccentric ring 47 loosely surrounding the shaft 10 and designed to reciprocate the pistons 44 within the respective pockets in the rotation of the rotor 43 with the shaft 10. Leading into the lower portion of the cylinder 41 is a fuel inlet pipe 48, while leading from the upper portion of the cylinder is a fuel delivery pipe 49 in open communication with a tank or reservoir and this pipe 49 is connected by means of branch pipes 50 with the bores 16 and 17 and the ports 19 and 20 respectively and located in the pipe 49 at the juncture of the branch pipes is a three-way valve 50' whereby the fuel may be delivered from the pipe 49 to the branch pipe leading to the bores 16 and 20, or to the branch pipe communicating with the passages 17 and 19 and the supply of fuel to the branch pipes cut off. The tank connected with the pipe 49 is indicated at 51.

The operation of my improved rotary internal combustion engine is as follows: To start the engine, the sleeve valve 21 is shifted by means of the hand lever 31 to establish communication between the ports 22 and the bore 16, and between the ports 23 and the opening 4. The valve 50' is now operated to place the bores 16 and 20 in open communication with the tank 51 and the gas flows through the pipe 49, the particular branch pipe 50 into the bore 16 and through the openings 22 in the sleeve valve 21 into the particular pockets in the rotor in alinement with such openings. As this fluid is under pressure the rotor is initially revolved in one direction. Immediately succeeding this initial rotation of the rotor, the valve 21 is moved to establish communication between the inlet passage 20 and the pockets in the rotor through the ports 27 and cut off communication between the bore 16 and the rotor. The fluid now flows from the passage 20 into the pockets in the rotor. In the rotation of the rotor, the fluid which is in the form of hydrocarbon gas is compressed by the pistons in the particular pockets and exploded when the pockets pass the spark plugs, thereby revolving the rotor continuously in one direction. When it is desired to reverse the direction of rotation of the rotor, the position of the valve sleeve 21 is reversed so that a starting charge may be admitted to the pockets in the rotor through the bore 17 and the propelling charge delivered to the pockets through the passage 19 and the openings 25 in the sleeve valve, thereby driving the rotor in the reverse direction.

The pockets in each row in the rotor alternate with those in adjacent rows, as clearly illustrated in the drawings so that power will be delivered continuously to the rotor.

When the sleeve valve is actuated to establish communication between the passage 19 and the pockets in the rotor through the openings 25, the openings 27 are out of registration with the passage 20, and vice versa, and when the pockets in the rotor pass the openings 26 in the sleeve valve, the burnt gases are discharged through the exhaust passage 18 to the atmosphere.

In the present instances, the cylinder 1 is formed, at diametrically opposite points, with outwardly projecting foot bearings 52 whereby the engine may be supported, while formed on the outer surface of the cylinder and extending longitudinally thereof are cooling ribs 53.

In practice, the bore 7 of the rotor is preferably packed with grease or other lubricant so that the moving parts of the engine will be thoroughly lubricated and kept comparatively cool.

It will, of course, be understood that in the operation of the engine, the compressor is actuated to deliver hydrocarbon gas to the storage tank under pressure so that such gas may be fed to the engine through the valve 50.

When it is desired to advance or retard the time of ignition of the charges in the pockets in the rotor, the hand wheel 39 is rotated, thereby revolving the shaft 37 and the trunnion 9 and in the rotation of the trunnion 9, a like movement is imparted to the shaft 11, thereby changing the positions of the pistons in the pockets so that the charges will be ignited either early or late in the movements of the pistons, as is readily understood by those skilled in the art.

I claim:

1. In a rotary internal combustion engine, a cylinder formed with a longitudinally extending exhaust passage, and with similarly extending inlet passages disposed upon opposite sides of the exhaust passage, a rotor in said cylinder formed with a longitudinal bore and with radially extending pockets, a stationary shaft in the bore in said rotor, pistons in said pockets respectively, rods connecting said pistons to said stationary shaft whereby in the movement of the pistons in the pockets, the rotary may be revolved around said shaft, a sleeve valve surrounding said rotor within said cylinder and controlling the flow of gas from said inlet passages to said pockets and from said pockets to said exhaust passage, and means for exploding the charges of gas in said pockets.

2. In a rotary internal combustion engine, a cylinder formed with a longitudinally extending exhaust passage, and with similarly extending inlet passages disposed upon opposite sides of the exhaust passage, a rotor in said cylinder formed with a longitudinal bore and with radially extending pockets, a stationary shaft in the bore in said rotor, pistons in said pockets respectively, rods connecting said pistons to said stationary shaft whereby in the movement of the pistons in the pockets, the rotor may be revolved around said shaft, a sleeve valve surrounding said rotor within said cylinder and controlling the flow of gas from said inlet passages to said pockets and from said pockets to said exhaust passage, and spark plugs carried by said cylinder and adapted to explode the charges in said pockets.

3. In a rotary internal combustion engine, a cylinder formed with a longitudinally extending exhaust passage, and with similarly extending inlet passages disposed upon opposite sides of the exhaust passage, a rotor in said cylinder formed with a longitudinal bore and with radially extending pockets, a stationary shaft in the bore in said rotor, pistons in said pockets respectively, rods connecting said pistons to said stationary shaft whereby in the movement of the pistons in the pockets, the rotor may be revolved around said shaft, a sleeve valve surrounding said rotor within said cylinder and controlling the flow of gas from said inlet passages to said pockets and from said pockets to said exhaust passage, means for exploding the charges of gas in said pockets, and means for reversing said sleeve valve to cut off communication between one of said inlet passages and said pockets whereby the direction of rotation of the rotor will be reversed.

4. In a rotary internal combustion engine, a cylinder formed with a longitudinally extending exhaust passage, and with similarly extending inlet passages disposed upon opposite sides of the exhaust passage, a rotor in said cylinder formed with a longitudinal bore and with radially extending pockets, a stationary shaft in the bore in said rotor, pistons in said pockets respectively, rods connecting said pistons to said stationary shaft whereby in the movement of the pistons in the pockets, the rotor may be revolved around said shaft, a sleeve valve surrounding said rotor within said cylinder and controlling the flow of gas from said inlet passages to said pockets and from said pockets to said exhaust passage, means for exploding the charges of gas in said pockets, and means for rotating said delivery shaft to change the positions of the pistons in the pockets whereby the time of the explosion may be varied.

5. In a rotary internal combustion engine, a cylinder formed with a longitudinally extending exhaust passage, and with similarly extending inlet passages disposed upon opposite sides of the exhaust passage, a rotor in said cylinder formed with a longitudinal bore and with radially extending pockets, a stationary shaft in the bore in said rotor, pistons in said pockets respectively, rods connecting said pistons to said stationary shaft whereby in the movement of the pistons in the pockets, the rotor may be revolved around said shaft, a sleeve valve surrounding said rotor within said cylinder and controlling the flow of gas from said inlet passages to said pockets and from said pockets to said exhaust passage, means for exploding the charges of gas in said pockets, a compressor driven from said rotor and provided with a gas inlet and a gas outlet, a tank in communication with the outlet of said compressor, and connections between said tank and said inlet passage in the cylinder.

6. In a rotary internal combustion engine, a cylinder formed with longitudinally extending bores, and with similarly extending inlet and exhaust passages, a rotor within said cylinder formed with radial pockets, pistons in said pockets, a stationary shaft extending through said rotor, connections between said shaft and pistons whereby the rotor may be revolved by the movement of the pistons within the pockets, a source of supply for said rotor, connections between said source and said bores, and inlet passages, respectively, means controlling communication between the source and said bores and passages, and a sleeve valve surrounding said rotor within said cylinder and movable to establish communication between either one of the bores and the pockets in the rotor whereby the rotor may be initially revolved and to establish communication between said inlet passages and the pockets in the rotor whereby the gas charges may be admitted to the pockets to propel the rotor, and means for exploding the gas charges in the pockets.

In testimony whereof I have hereunto set my hand in presence of two subscribing witnesses.

EDWARD SOPPITT.

Witnesses:
S. H. GILBERT,
W. W. RICKARD.